United States Patent
Zhu et al.

(10) Patent No.: US 7,644,445 B2
(45) Date of Patent: Jan. 5, 2010

(54) SECURE KEY MANAGEMENT FOR SCALABLE CODESTREAMS

(75) Inventors: Bin Zhu, Edina, MN (US); Min Feng, Chengdu (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 151 days.

(21) Appl. No.: 11/178,943

(22) Filed: Jul. 11, 2005

(65) Prior Publication Data

US 2007/0009103 A1   Jan. 11, 2007

(51) Int. Cl.
*H04L 9/18* (2006.01)
*H04L 9/34* (2006.01)

(52) U.S. Cl. .......................................... 726/30; 380/278

(58) Field of Classification Search ...................... 726/2, 726/17, 27, 30; 380/259, 278
See application file for complete search history.

(56) References Cited

U.S. PATENT DOCUMENTS

| | | | | |
|---|---|---|---|---|
| 7,568,235 B2* | 7/2009 | Bird et al. | ...................... | 726/27 |
| 2004/0141613 A1* | 7/2004 | Hayashi | ........................ | 380/28 |
| 2004/0174999 A1* | 9/2004 | Iwamura et al. | ............. | 380/277 |

OTHER PUBLICATIONS

Jajodia, Sushil et al."Flexible Support for Multiple Access Control Policies."ACM Transactions on Datbase Systems 26.2(2001):214-260.*
Bertino, Elisa et al. "A Hierarchical Access Control Model for Video Database Systems."ACM Transaction on Information Systems 21.2(2003):155-191.*
Akl et al, "Cryptographic Solution to a Problem of Access Control in a Hierarchy", ACM Transactions on Computer Systems, vol. 1, No. 3, Aug. 1983, pp. 239-248.
Bresson et al, "The Group Diffie-Hellman Problems", Proc. Advances in Cryptology-ASIACRYPT 2002, Queenstown, New Zealand, Dec. 2002, LINCS 2501, 14 pages.
Deng et al, "Securing JPEG2000 Code-Streams", Security in the 21st Century, Lee, Shieh and Tygar (Eds), Springer, 2004, pp. 1-11.
Harn et al, "A Cryptographic Key Generation Scheme for Multilevel Data Security", Computers & Security, vol. 9, No. 6, 1990, pp. 539-546.
"Information Technology—JPEG 2000 Image Coding System, Part 1: Core Coding System", ISO/IEC 15444-1, Mar. 2000, 240 pages.

(Continued)

*Primary Examiner*—Jung Kim
*Assistant Examiner*—Venkat Perungavoor
(74) *Attorney, Agent, or Firm*—Lee & Hayes, PLLC (57) ABSTRACT

Key management is performed to generate a single key allowing of the decoding of all authorized levels of a plurality of access types within a scalable codestream. An access node set is derived from sets representing access types having hierarchies representable by fully ordered sets, such as resolution and layer levels, and hierarchies representable by partially ordered sets, such as tile and precinct levels. The access node set derived is a partially ordered set representing the combinations of levels of the access types included within the codestream. A hierarchical key management system is applied to the access node set to assign a key to each of the access nodes, generate content encryption keys, and encrypt the codestream. A client receiving the codestream, access node set, and other public information uses the key to derive additional keys to decrypt the codestream.

4 Claims, 9 Drawing Sheets

OTHER PUBLICATIONS

Li, "Embedded Audio Coding (EAC) with Implicit Auditory Masking", Proceedings of 10th ACM Intl Conf on Multimedia, France, Dec. 2002, pp. 592-601.

Li, "Overview of Fine Granularity Scalability in MPEG-4 Video Standard", IEEE Transactions on Circuits and Systems for Video Technology, vol. 11, No. 3, Mar. 2001, pp. 301-317.

MacKinnon et al, "An Optimal Algorithm for Assigning Cryptographic Keys to Control Access in a Hierarchy", IEEE Transactions on Computers, vol. C-34, No. 9, Sep. 1985, pp. 797-802.

Steiner et al, "Diffie-Hellman Key Distribution Extended to Group Communication", Proceedings of 3rd ACM Conf on Computer and Communications Security, India, 1996, pp. 31-37.

Wu et al, "An Access Control Scheme for Partially Ordered Set Hierarchy with Provable Security", Cryptology ePrint Archives, Report 2004/295, 2004, 15 pages.

Wu et al, "Efficient and Universal Scalable Video Coding", IEEE ICIP, 2002, vol. 2, 4 pages.

Yuan et al, "Layered Access Control for MPEG-4 FGS Video", 2003 Intl Conf on Image Processing, ICIP Sep. 2003, vol. 1, 4 pages.

Zhong, "A Practical Key Management Scheme for Access Control in a User Hierarchy", Computers & Security, vol. 21, No1. 8, 2002, pp. 750-759.

Zhu et al, "A Framework of Scalable Layered Access Control for Multimedia", IEEE Intl Symposium on Circuits and Systems, May 2005, 4 pages.

Zhu et al, "An Efficient Key Scheme for Layered Access Control of MPEG-4 FGS Video", 2004 IEEE Intl Conf on Multimedia and Expo, Jun. 2004, 4 pages.

Zhu et al, "Encryption and Authentication for Scalable Multimedia: Current State of the Art and Challenges", Proceedings of the SPIE, Internet Multimedia Management Systems V, vol. 5601, Oct. 2004, 14 pages.

Zhu et al, "Scalable Protection for MPEG-4 Fine Granularity Scalability", IEEE Transactions on Multimedia, vol. 7, No. 2, Apr. 2005, pp. 222-233.

\* cited by examiner

SECURE KEY MANAGEMENT FOR SCALABLE CODESTREAMS

BACKGROUND

People use many different types of digital devices to access services over the Internet and other networks. As is widely understood, many of these services, ranging from news services to on-line shopping and entertainment, make extensive use of photographs and other images, videos, and audios.

Figure 1:
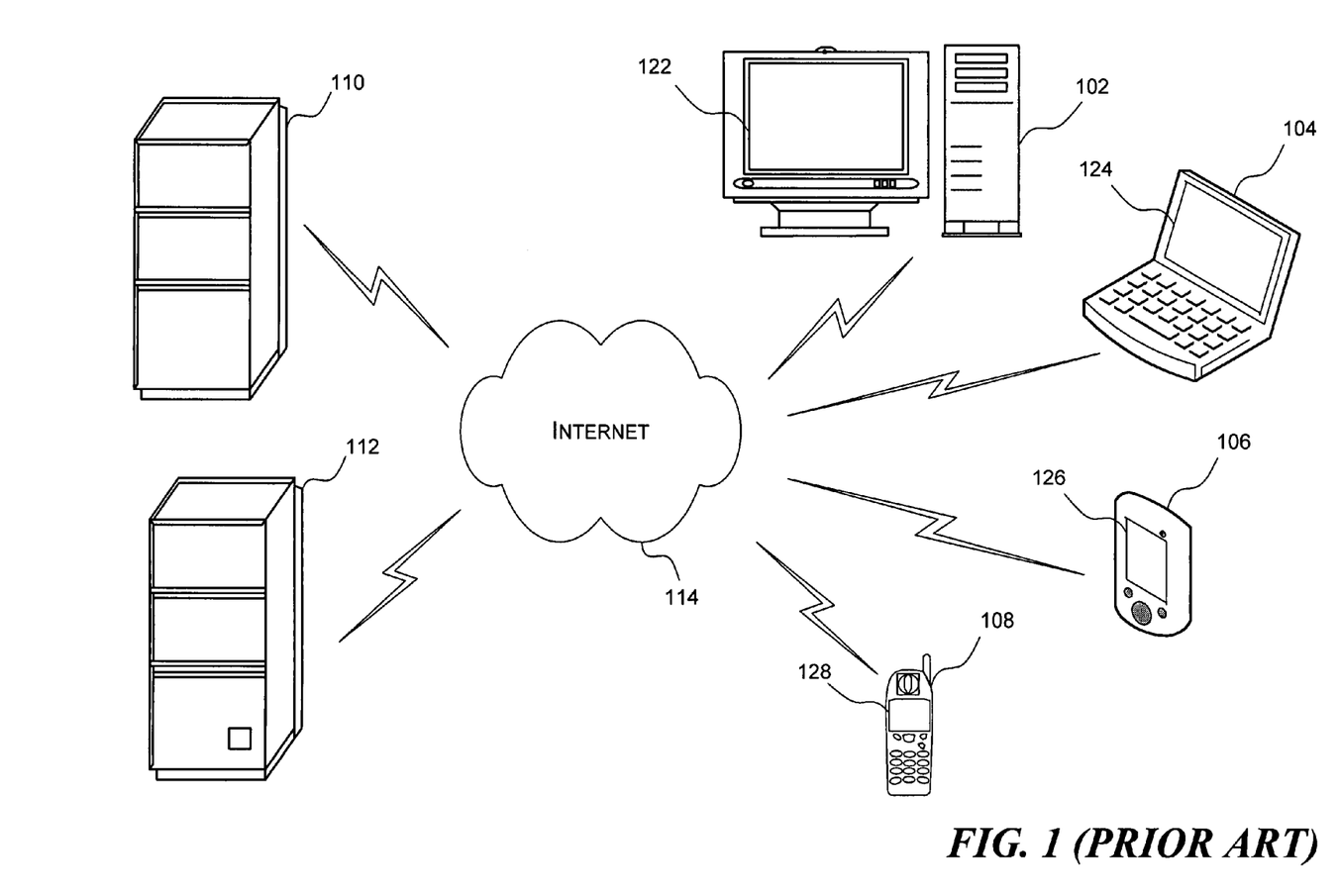
FIG. 1 (Prior Art) is a network in which different devices with different display capabilities used to access content on the same servers.

FIG. 1 illustrates a number of different digital devices 102-108 that may be used to access services and content maintained on servers 110 and 112 via the Internet 114. Desktop computer 102 has a large, high-resolution display 122, thus, its user is likely to want images or videos displayed at their highest resolutions to take advantage of the capabilities of display 122. On the other hand, portable display 124 of portable computer 104 may not provide resolution comparable to that of the high-resolution display 122 of desktop computer 102. Alternatively, even if portable display 124 does support high resolution graphics, portable computer 104 may use a shared system memory for graphics support, and its user may be unwilling to allocate system memory to support high-resolution graphics.

In addition to desktop computer 102 and portable computer 104, handheld devices also are used to access Internet or other multimedia services. For example, personal digital assistant 106 includes a touchscreen display 126, measuring a few inches on each side, for displaying small images or video frames with a portion of the resolution available with desktop computer 102 and portable computer 104. Even a smaller device, such as wireless telephone 108, includes a phone display 128 usable to access Internet or other multimedia services and to present very small images and other multimedia content to a user.

The range of devices 102-108 accessing content on servers 110 and 112 has posed a problem for content providers. More specifically, because of the range of displays 122-128 used by devices 102-108, respectively, content providers have had to make multimedia content available in different formats. For example, high resolution images or high definition videos have to be made available to users with high resolution displays 122. On the other hand, condensed images or videos with only a fraction of the resolution or color granularity of the high resolution images or high definition videos have to be made available for users with devices such as personal digital assistant 106 and wireless telephone 108 that have lower processing capabilities and lower resolution displays 126 and 128, respectively. To access the appropriate format of multimedia content, users manually specify desired parameters such as resolution and quality. Alternatively, servers 110-112 may poll devices 102-108 to determine what type of graphics, video, or audio data each of the devices 102-108 can support to determine what format of multimedia content to transmit to devices 102-108.

The problem of servers 110-112 having to maintain and selectively communicate multiple different multimedia formats is addressed by scalable multimedia formats. For example, the Joint Photographic Experts Group 2000 ("JPEG 2000") format specifies an image codestream that is scalable for each of a number of different access types including tile, resolution, layer, color component, and precinct. The codestream is scalable at a number of levels within each of these access types. A single codestream can be accessed by different devices to present multimedia adapted to levels of each access type that each of the devices is configured to support. Thus, one multimedia codestream can be stored and provided to any device supporting the scalable codestream.

Although use of a scalable codestream eliminates having to maintain multiple codestreams for a particular multimedia content, controlling access to the scalable codestream involves complicated key management. When multiple, different multimedia codestreams are maintained, a key is generated for each particular codestream and is issued to a user authorized to access the multimedia. Content encryption keys used to decrypt data packets can be derived from the key using known methods, allowing the user to access the encrypted multimedia.

Using a scalable codestream, generating and providing appropriate keys may be much more problematic. A user authorized for a certain level of access will have to be issued multiple keys to provide a key for the levels of access for which the user is authorized as well as lower ranked levels of access that are encompassed in the user's authorized level of access.

Figure 2A:
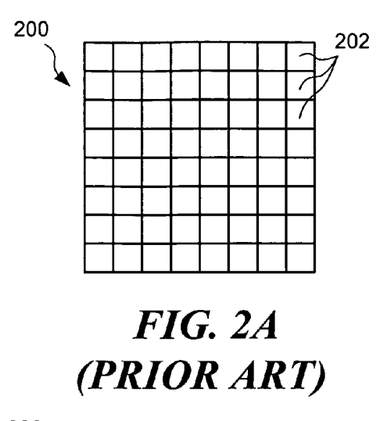
FIGS. 2A-2F (Prior Art) illustrate data blocks used in presenting image content at different levels of different access types.

FIGS. 2A-2F are a series of block diagrams illustrating the nature of a JPEG 2000 codestream. FIG. 2A shows an image 200 as a user views it: image 200 is comprised of an array of elements 202. However, the actual structure of the scalable codestream is not so simply organized.

Figure 2B:
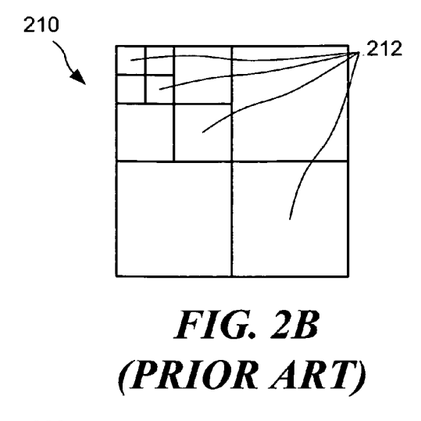
Figure 2C:
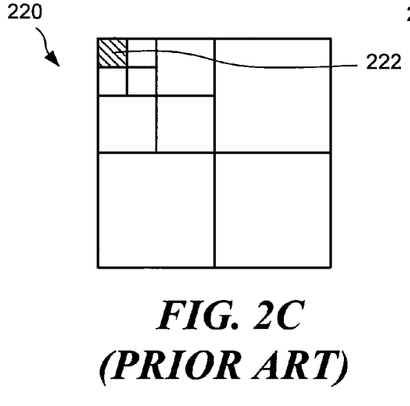
Figure 2D:
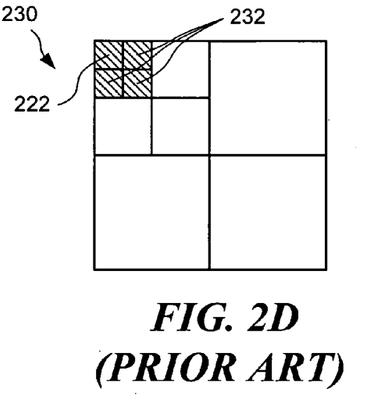
Figure 2E:
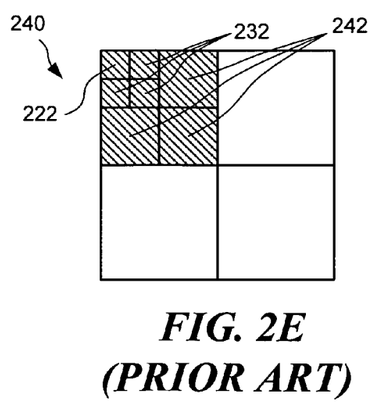

FIG. 2B is an array 210 of differently sized data blocks 212, representing how different resolution levels are represented in the codestream. As a function of discrete wavelet transformation, accessing different resolution levels involves accessing different blocks of data 212 in the codestream. As shown in FIG. 2C, to access a lowest supported resolution level, only a first data block 222 of array 220 is accessed. As shown in FIG. 2D, to access a next highest resolution level, data block 222 and a series of adjoining second data blocks 232 are accessed. To access a next highest resolution level, as shown in FIG. 2E, first data block 222, second data blocks 232, and a series of adjoining third data blocks 242 all must be accessed. Adjoining groups of data blocks are accessed until the highest available image resolution is reached. Thus, data blocks used in presenting higher levels of resolution encompasses data used in presenting lower levels of resolution For a user authorized to view images at the highest resolution, the user must be provided with a key from which the data blocks associated with the highest level of resolution can be decrypted, as well as the keys from which all the data blocks associated with lower levels of resolution can be decrypted. Alternatively, using a hierarchical key system, a user can be given one key from which keys to lower levels of access can be derived.

Figure 2F:
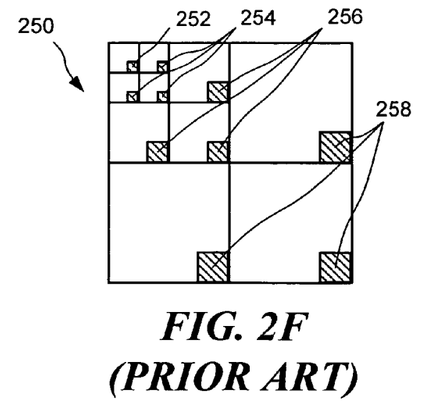

Unfortunately, not all access types in a scalable codestream have hierarchical structures that lends themselves to hierarchical key systems. For example, tile access, which allows a user to access one or more portions of an image, does not involve accessing hierarchically inclusive portions of data. As shown in FIG. 2F, array 250 shows portions of data blocks 252-258 that are used to present a portion of an image at high resolution. To present the selected portion of the image, portions of data blocks 252-258 representing different resolution levels all must be accessed. Because the data to be used does not adhere to a hierarchical structure, multiple keys would have to be generated, maintained, and distributed to selectively control access to different resolutions within the image.

SUMMARY

Key management is performed to generate a single key allowing of the decoding of all authorized levels of a plurality of access types within a scalable codestream. An access node set is derived from sets representing access types having hierarchies representable by fully ordered sets, such as resolution and layer levels, and hierarchies representable by partially ordered sets, such as tiles and precincts. The access node set derived is a partially ordered set representing the combinations of levels of the access types included within the codestream. A hierarchical key management system is applied to the access node set to assign a key to each of the access nodes, generate content encryption keys, and encrypt the codestream. A client receiving the codestream, access node set, and other public information uses the key to derive additional keys to decrypt the accessible data in a codestream.

A key set including keys for each of the access nodes is generated so that keys are available for each of the access nodes representing the different level access combinations available. A hierarchical key scheme, such as a Group Diffie Hellman key exchange protocol, generates keys that secure the codestream and allow access to the authorized level of access and included lower levels of access with only a single key.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

Representing Combinations of Levels of Access Using Partially-Ordered Sets

As previously described in connection with FIGS. 2A-2E, higher ranked levels of some access types within a scalable codestream are inclusive of other levels. In a JPEG 2000 scalable codestream, for example, higher ranked levels of resolution access, layer access, and color component access all are inclusive of lower levels. Because each lower level within these access types is included within successively higher levels, levels within these access types are fully ordered hierarchies representable by fully-ordered sets.

By contrast, access types such as tile access or precinct access are not fully inclusive of other levels of tile access or precinct access. In other words, data representing one tile in a codestream does not include or depend on data representing another tile in the codestream, although a grouping of tiles may include data representing both tiles. Accordingly, access types such as access by tile and access by precinct type are organized as a distinct combination of individual blocks. Levels within these access types constitute partially-ordered hierarchies representable by partially-ordered sets.

Mathematically, a partially ordered set is representable by a designation $(P, \leq)$, where P is a finite set, and $\leq$ is a binary relationship. Where both a and b are members of P, and a $\leq$ b, all constituents of member a are constituents of member b, but not all constituents of subset b are constituents of subset a. Thus, if a and b represent access to tiles within a codestream, a user who has access to tile b also has access to tile a, but a user having access to tile a does not give the user access to tile b.

Representing access types such as tile access and precinct access with a partially ordered set is useful in encryption and key generation for scalable codestreams. For example, if subset a represents data packets associated with one level within a scalable access type, and subset b is a higher ranked level within the same scalable access type, a key that allows access to subset b will allow access to subset a. Thus, by providing a single key to subset b, keys used to decode all the included levels can be generated.

Figures 3A, 3B, 3C:
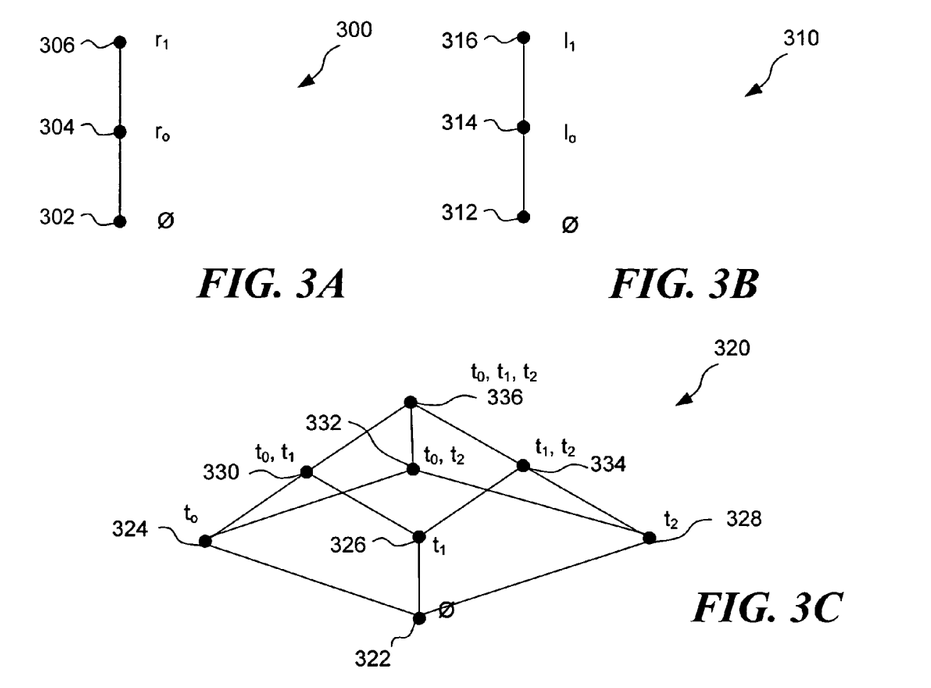
FIGS. 3A-3C are Hasse diagrams representing potential different levels of different access types included in a scalable codestream.

FIGS. 3A-3C are Hasse diagrams representing levels of three different access types within a scalable codestream. In the Hasse diagrams, each vertex point represents an access level of the access type. Each line extending between vertices is an edge that represents an inclusive access priority of a higher access level or vertex relative to a lower access level or vertex.

FIG. 3A is a Hasse diagram 300 for resolution, including an empty level $\emptyset$ 302 and two resolution levels $r_0$ 304 and $r_1$ 306. Resolution levels, as previously described, constitute a fully-ordered hierarchy and, thus, are representable as a fully-ordered set. In other words, data included in the subset of resolution data represented by resolution level $r_0$ 304 is encompassed within the subset of resolution data $r_1$ 306. On the other hand, not all data included within resolution level $r_1$ 306 is included within resolution level $r_0$ 304.

Similar to FIG. 3A, FIG. 3B is a Hasse diagram for layer access level including an empty level $\emptyset$ 312 and two layer levels $l_0$ 314 and $l_1$ 316. Again the empty level $\emptyset$ 312 is the lowest level in FIG. 3B. Layer levels also represent a fully-ordered hierarchy representable as a fully-ordered set.

In contrast to the fully-ordered hierarchies of resolution access levels and layer access levels, tile access levels are a partially-ordered hierarchy that are representable as a partially ordered set, as illustrated in FIG. 3C. FIG. 3C is a Hasse diagram 320 for an example of a group of three adjacent tiles, $t_0$, $t_1$, and $t_2$, making up a portion of one row of an image. Above an empty level $\emptyset$ 322, Hasse diagram 320 includes three vertices for each of $t_0$ 324, $t_1$ 326, and $t_2$ 328. On a next higher level, Hasse diagram 320 includes vertices representing possible combinations of two set of tiles including $t_0$, $t_1$ 330, $t_0$, $t_2$ 332, and $t_1$, $t_2$ 334. On a top level, Hasse diagram 320 includes a vertex representing a combination of three tiles, $t_0$, $t_1$, $t_2$ 336.

It will be understood that, in Hasse diagrams 300 and 310, no combinations were represented as are represented in Hasse diagram 320. In the access types represented in Hasse diagrams 300 and 310, resolution access and layer access, the represented access types have fully ordered hierarchies in which each higher ranked vertex, representing a higher ranked subset, includes all the elements of the lower subset of elements.

Hasse diagrams 300, 310, and 320 can be reduced to eliminate unnecessary levels for some scalable codestreams. Although some scalable codestreams may make use of empty levels for one or more access types, a JPEG 2000 codestream does not include any empty levels within any of its scalable access types. Thus, to access a JPEG 2000 codestream, an access level must be specified and granted to at least one non-empty level of resolution access, layer access, tile access, and other access types (not shown).

Figure 3D:
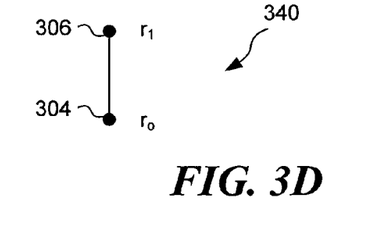
FIGS. 3D-3F are Hasse diagrams of FIGS. 3A-3C reduced to remove unusable levels within each of the depicted access types.
Figure 3E:
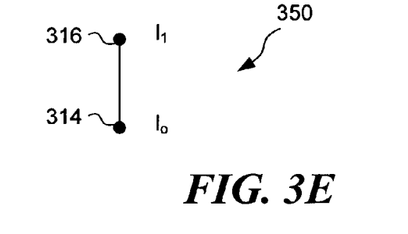
Figure 3F:
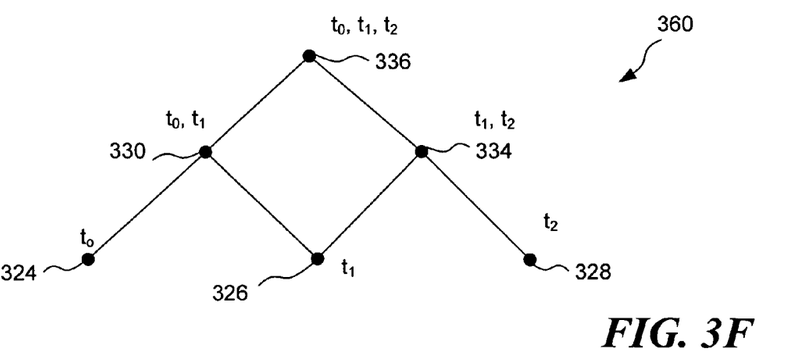

Thus, in the example of a JPEG 2000 codestream illustrated in FIGS. 3A-3C, empty levels ∅ 302, ∅ 312 and ∅ 322, the lowest levels in the Hasse diagrams 300, 310, and 320, respectively, do not represent accessible levels for their respective access types and can be omitted. Similarly, edges joining ∅ vertices 302, 312, and 322 to other vertices can omitted. Omitting superfluous vertices from Hasse diagrams 300, 310, and 320 of FIGS. 3A, 3B, and 3C, yields Hasse diagrams 340, 350, and 360 of FIGS. 3D, 3E, and 3F, respectively.

In addition, partially ordered sets and their respective Hasse diagrams representing access types with partially ordered hierarchies can be further reduced to eliminate unnecessary combinations which can never be accessed by users. Hasse diagram 320 is the hierarchical representation of the partially ordered set for tile access to three consecutive tiles in one row, $t_0$, $t_1$, $t_2$. Granting access to a combination of nonconsecutive tiles, $t_0$ and $t_2$, is unnecessary in some applications. Thus vertex 332 representing this combination also can be eliminated from Hasse diagram 360 of FIG. 3F in those applications.

To represent levels of access to a scalable codestream, the fully and partially ordered sets representing the levels of each access type are combined. Mathematically, the fully and partially ordered sets are combined by calculating the product of the elements within each set. The partially ordered set (P, ≦) of the scalable access control is just a product of the fully and partially ordered sets ($P_i$, ≦) of all scalable types, as represented by Eq. 1:

$$(P, \leq) = \times_i (P_i, \leq) \qquad (1)$$

The number of vertices in the resulting partially ordered set is equal to the product of the numbers of vertices in each of the scalable types represented by Eq. 2:

$$|P| = \Pi_i |P_i| \qquad (2)$$

As used in Eq. 2, the operator |X| represents the cardinality of a set X. The number of edges in the product's Hasse diagram is given by Eq. 3:

$$\sum_i e_i \cdot |P|/|P_i|, \qquad (3)$$

In Eq. 3, $e_i$ is the number of edges in the Hasse diagram of i-th scalable type.

Figure 4A:
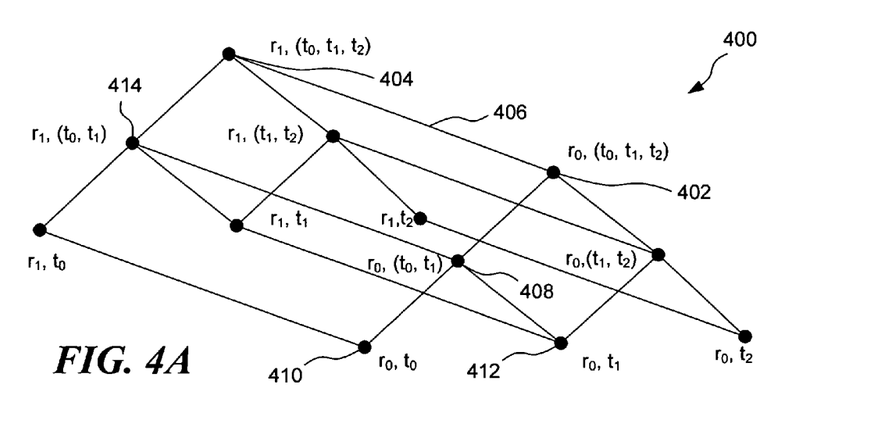
FIGS. 4A-4B are Hasse diagrams representing combinations of levels of access types derived from Hasse diagrams of FIGS. 3D-3F.
Figure 4B:
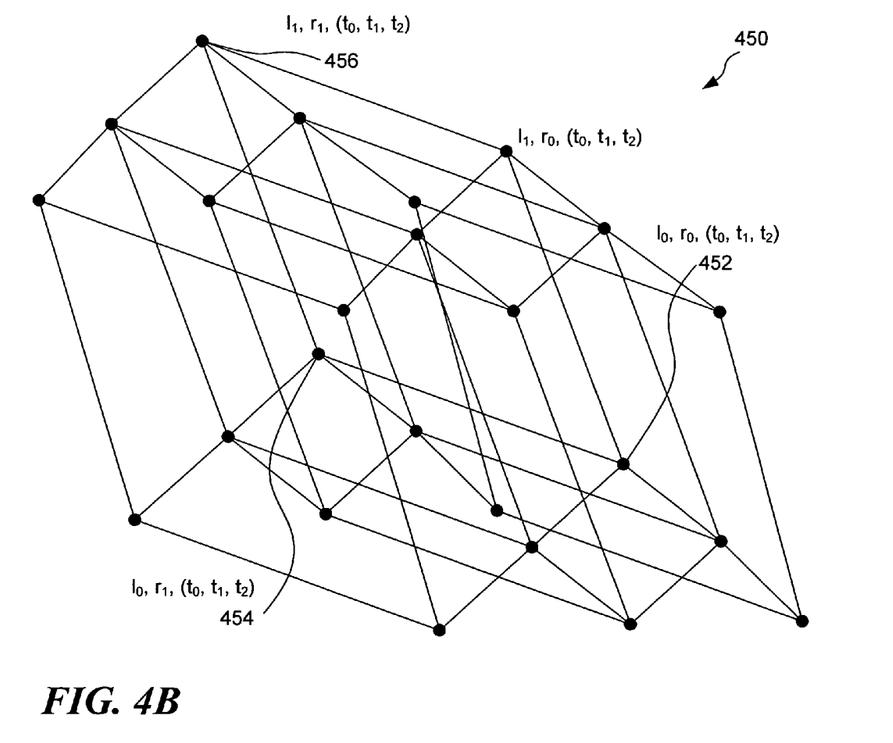

Exemplary portions of resulting partially ordered sets are represented by Hasse diagrams 400 and 450 of FIGS. 4A and 4B, respectively. FIG. 4A shows Hasse diagram 400, which represents the combination of Hasse diagrams 340 (FIG. 3D) and 350 (FIG. 3F), thereby representing the possible combinations of levels for resolution access and tile access. Hasse diagram 400 includes two iterations of Hasse diagram 360 to represent each level of tile access for two different levels of resolution access. Corresponding vertices are joined by edges to represent the hierarchical relationship between resolution levels $r_0$ and $r_1$. It will be appreciated that the iterations of Hasse diagram 360 included in Hasse diagram 400 are offset rather than being vertically aligned to better suggest the dimensionality of the combinations represented.

For example, vertex 402 represents a level combination for resolution level $r_0$ and tile access level $t_0$, $t_1$, $t_2$. Vertex 404 represents a level combination for resolution levels $r_1$ and tile access level $t_0$, $t_1$, $t_2$. An edge 406 is drawn between vertices 402 and 404 to signify that access to a combination of levels represented by vertex 404 includes access to levels represented by vertex 402, as well as to all combinations of lower levels of access. Thus, a user who has access to all tiles at the highest resolution $r_1$ also has access to all tiles at lower resolutions.

To take another example, vertex 408, represents a level combination for resolution level $r_0$ and tile access level $t_0$ and $t_1$. Access to this level combination also includes access to vertex 410, representing lower ranked level combination for resolution level $r_0$ and tile access level $t_0$, and to vertex 412 representing a level combination for resolution level $r_0$ and tile access level $t_1$. However, access to vertex 406 does not permit access to the level combination 402, which includes additional tile access to tile $t_2$, or vertex 414 which includes access to a higher resolution level $r_1$.

FIG. 4B shows Hasse diagram 450, which represents the combination of Hasse diagram 350 (FIG. 3E) along with Hasse diagrams 340 (FIG. 3D) and 360 (FIG. 3F), thereby representing the possible combinations of levels for layer access, resolution access, and tile access. For the sake of visual clarity, labels for the level combinations represented by most vertices are omitted, although a few vertices are labeled for example.

Hasse diagram 450, for example, includes vertex 452, which represents a combination of layer level $l_0$, resolution level $r_0$, and tile access to tiles $t_0$, $t_1$, and $t_2$. Hasse diagram 450 also includes vertex 454, which represents a combination of layer level $l_0$, resolution level $r_1$, and tile access to tiles $t_0$, $t_1$, and $t_2$. Access to levels represented by vertex 454, which includes a higher resolution level, includes access to all combinations of lower levels, including the level combinations represented by vertex 452, and all vertices below both vertices 452 and 454. On the other hand, a user authorized to access the level combination represented by vertex 454 does not have access to the level combination represented by vertex 456, because the user is not authorized for access to layer level $l_1$, which represents the level combination of $l_1$ with resolution level $r_0$, and tile access to tiles $t_0$, $t_1$, and $t_2$.

The level combinations visually represented in Hasse diagrams 4A and 4B represent an access node set for access types shown. The access node set includes an access node representing each of the available combinations of access levels within the codestream to which a user may be provided access.

Using the partially ordered set of access nodes and a hierarchical key scheme, a set of keys is generated that provides access to a level combination represented by each access node. Moreover, the key associated with each access node provides access to all lower-ranked level combinations associated with the access node. Thus, by providing to the user an access node set, a single key corresponding to the access node representing a particular level combination, and some related public information, the user will be able to derive keys for all lower-ranked, included levels of access. No additional keys have to be provided to the user to derive keys for lower ranked level combinations, as is further described below.

Generating Access Node Sets and a Corresponding Key Set

Figure 5:
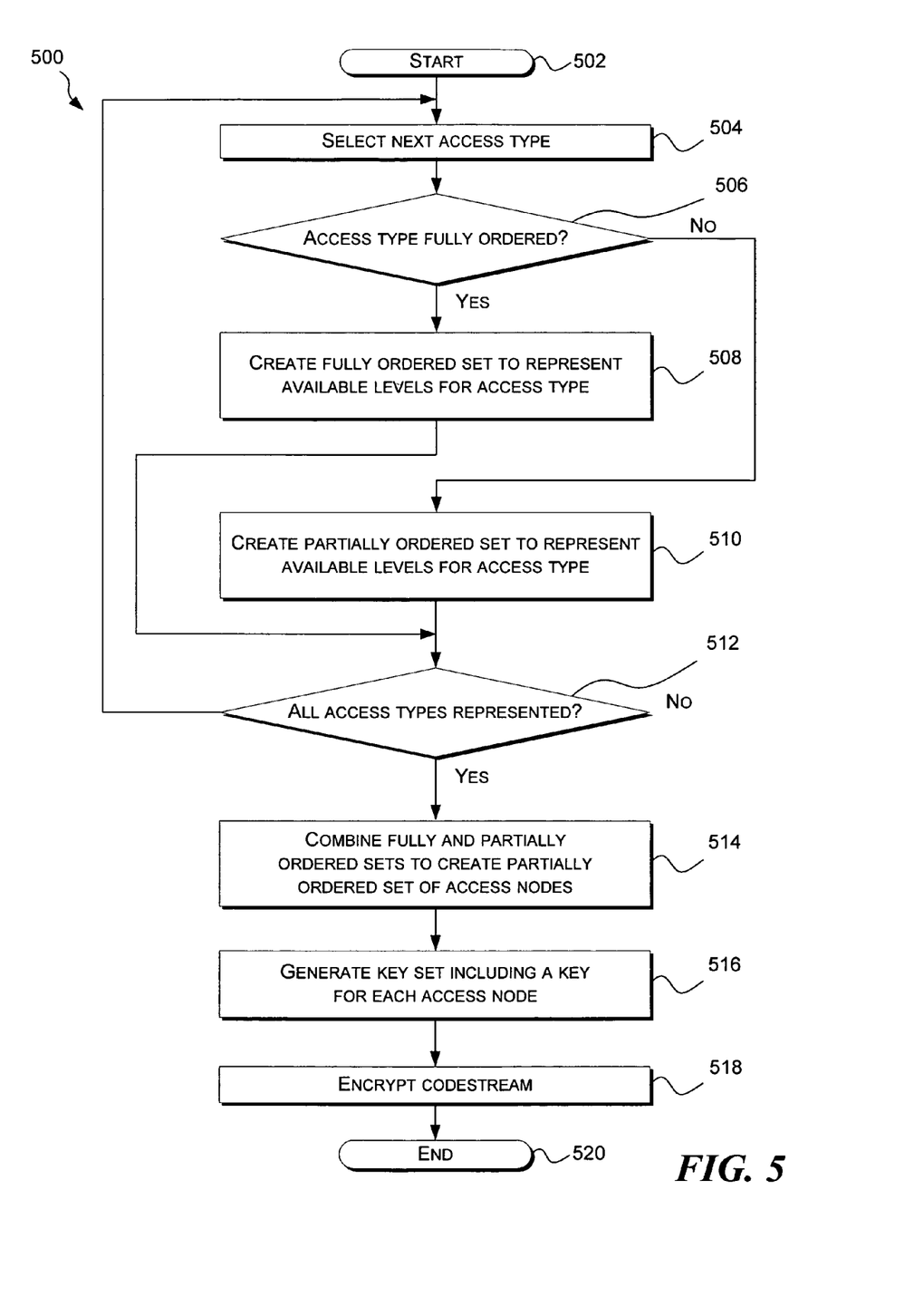
FIG. 5 is a flow diagram illustrating a mode of generating access nodes and encrypting a scalable codestream.

FIG. 5 is a flow diagram 500 illustrating the logical steps for a representing level combinations for the access types in a scalable code stream and associating keys with each combination. The combinations are represented by a set of access nodes, and a key is associated with each of the access nodes. Each key allows a user to access the codestream at levels of each access type for which the user is authorized, as well as all lower ranked level combinations.

Flow diagram 500 begins at block 502. At block 504, a next access type is selected to be represented from among the access types included in the scalable codestream. At decision block 506, it is determined if the access type is a full-ordered access type, including a fully ordered hierarchy that is representable with a fully ordered set. As previously described, for example, in a JPEG 2000 scalable codestream, access types for resolution, layers, and color component are fully ordered hierarchies. If it is determined at block 506 that the access type is a fully ordered hierarchy, at block 508 a fully ordered set is created to represent the available levels for the access type.

On the other hand, if it is determined at decision block 506 that the access type is not a fully ordered hierarchy, the access type must represent a partially ordered hierarchy. As previously described in the example of a JPEG 2000 scalable codestream, access types for tile access and precinct access are partially ordered hierarchies. At block 510, a partially ordered set is created to represent the available levels of the access type.

At decision block 512 it is determined if all the access types in the codestream have been represented. If not, flow diagram 500 loops to block 504 to select the next access type to be represented. However, once it is determined at decision block 512 that all the access types have been represented, at block 514, all the fully and partially ordered sets representing each of the access types are combined to create a partially ordered set of access nodes. Using the set of access nodes, at block 516, a key set is generated including a key for each access node, and at block 518 the codestream is encrypted, as is further described below with regard to FIG. 6. Once the encryption at block 518 is completed, flow diagram 500 ends at block 520.

According to a mode of level combination and key association of flow diagram 500, content encryption and key generation is performed a single time for each codestream. The key set includes an available key for each level combination available within the codestream. Thus, the digital rights management of the scalable codestream is a static process in general that does not have to be repeated to allow authorization and generate keys for request for dynamic level combinations. The access node set and the key set are stored on an authorization or license server for keys to be distributed after payment is received or other conditions are met.

Hierarchical Key Generation Scheme for Assigning Keys to Access Nodes

Figure 6:
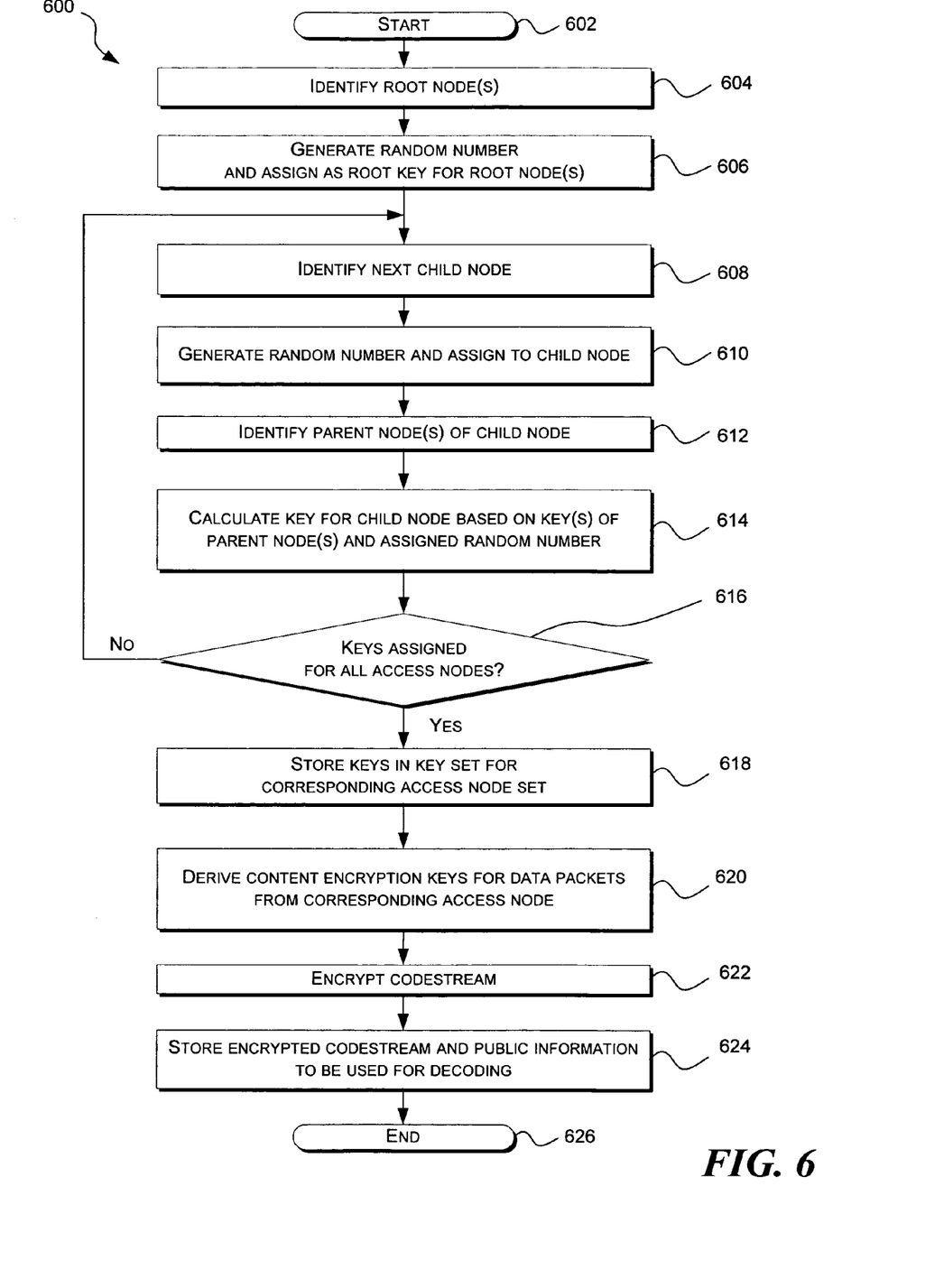
FIG. 6 is a flow diagram illustrating a mode of encrypting a scalable codestream and generating a set of keys for decoding the codestream.

FIG. 6 is a flow diagram 600 representing a mode of generating keys for the access nodes. Flow diagram 600 begins at block 602. At block 604, one or more root nodes is identified from among the access node set. As previously illustrated in FIGS. 4A and 4B, the root node or nodes represent access nodes associated with a combination of the highest access level for each of the access types. At block 606, for each root node, a random number is generated and assigned as its key. In one mode of key generation, an appropriate prime number p is selected and a generator $\alpha$ in $\alpha \epsilon Z_p^*$ is chosen, where $\alpha$ is defined according to Eq. 4:

$$\alpha \epsilon Z_p^*, 2 \leq \alpha \leq p-2 \qquad (4)$$

At block 608, a next child node is identified. Starting with the root node, a child node represents a next access node in descending rank. At block 608, a random number is generated as previously described and assigned to the child node. At block 610, a random number is generated, as previously described in connection with Eq. 2, and assigned to the child node. At block 612, parent nodes of the child node are identified. Parent nodes for each child are those access nodes for which the access level for one of the access types is one level higher. For example, referring back to Hasse diagram 400 of FIG. 4A, vertex 408 associated with access levels $r_0$, $(t_0, t_1)$ is a child node of vertex 402 associated with access levels $r_0$, $(t_0, t_1, t_2)$ and vertex 414 associated with access levels $r_1$, $(t_0, t_1)$. Thus, vertices 402 and 414 are parent nodes of vertex 408 because vertices 402 and 414 each represent one higher access level to one access type than is represented by vertex 408.

At block 614, the key for the child node is calculated using the random number assigned to the child node at block 610 and the values of the keys of the parent nodes identified at block 612. In one mode of key generation, a Group Diffie Hellman key exchange agreement is used to calculate each child key. For each child node i, each child key $k_i$ is based on the random number assigned to the child node $r_i$, and $R_i$ is the product of the keys of all of the parent nodes for the child node i as defined by Eq. 5:

$$R_i = \Pi_{k \epsilon K(v_i)} k \qquad (5)$$

Each child key $k_i$ is calculated using Eq. 6:

$$k_i = \alpha^{r_i \cdot R_i} \mod p \qquad (6)$$

At decision block 616 it is determined if keys have been assigned for all of the access nodes in the access node set, including the root node and all the child nodes. If not, flow diagram 600 loops to block 608 to identify the next child node. Once it is determined at decision block 616 that all child nodes have been assigned, at block 618 the generated keys are stored in a key set corresponding with the access node set. With each of the keys stored in the key set, as requests for access to various level combinations for each of the access types in the codestream are received, the appropriate key can be drawn from the key set without having to generate an additional key or perform any other calculations.

Once the keys have been derived and stored, at block 620 content encryption keys for each of the data packets associated with each access node are derived. In one mode of encryption and key generation, the key for the associated access node is hashed according to a cryptographic hash function. The hash function generates a content encryption key of a desired size. At block 622, the data packets in the codestream are encrypted using the content encryption keys.

At block 624, the encrypted content is stored along with public information that will be used to derive keys for decrypting the codestream. According to one mode of key generation, the partially ordered access node set, the prime number p, α, and, for each child node, the values of Eq. 7:

$$\{\alpha^{r_j \cdot R_j / k} \bmod p\} \quad (7)$$

In Eq. 7, $r_i$ is the random number associated with each node i, $R_i$ is the product of the keys of the parent nodes, and k is the key of a parent node of the node i. The encrypted content may be stored on a server to permit users to download the encrypted codestream. Flow diagram 600 ends at block 626.

Accessing Codestream Encoded Using Access Node Set and a Single Key

Figure 7:
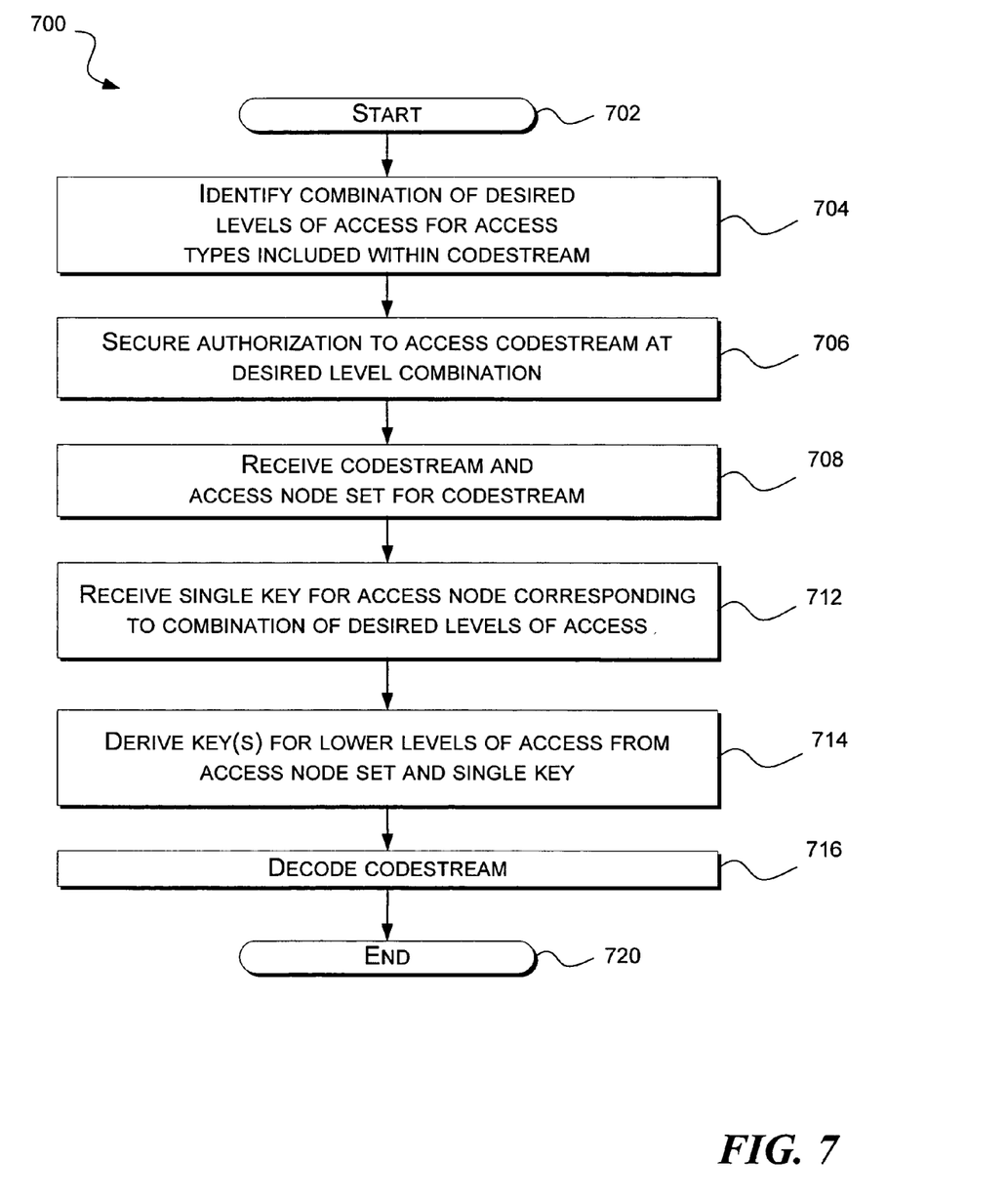
FIG. 7 is a flow diagram illustrating a mode of decoding an encrypted scalable codestream using a set of access nodes and a single key.

FIG. 7 is a flow diagram 700 illustrating a mode of accessing a codestream encoded according to flow diagrams 500 (FIG. 5) and 600 (FIG. 6). Flow diagram 700 begins at block 702. At block 704, a level combination specifying the desired level of each scalable access type in the codestream is identified. More specifically, the level combination is specified to a server over the Internet or using another manner of access. At block 706, authorization to access the codestream at the desired level combination is secured. At block 708, the codestream and the access node set for the codestream are received. In one mode of encoding the encrypted codestream, the access node set is included in a designated portion of the codestream.

At block 712, a single key associated with the access node representing the desired level combination is received. At block 714, using the key and the access node set, keys for lower ranked levels of access are derived. For example, using a Group Diffie Hellman key exchange, using the access nodes, the key, and related public information, the content encryption keys for the data packets can be derived. At block 716, the codestream is decoded. Flow diagram 700 ends at block 700.

Computing System for Implementing Exemplary Embodiments

Figure 8:
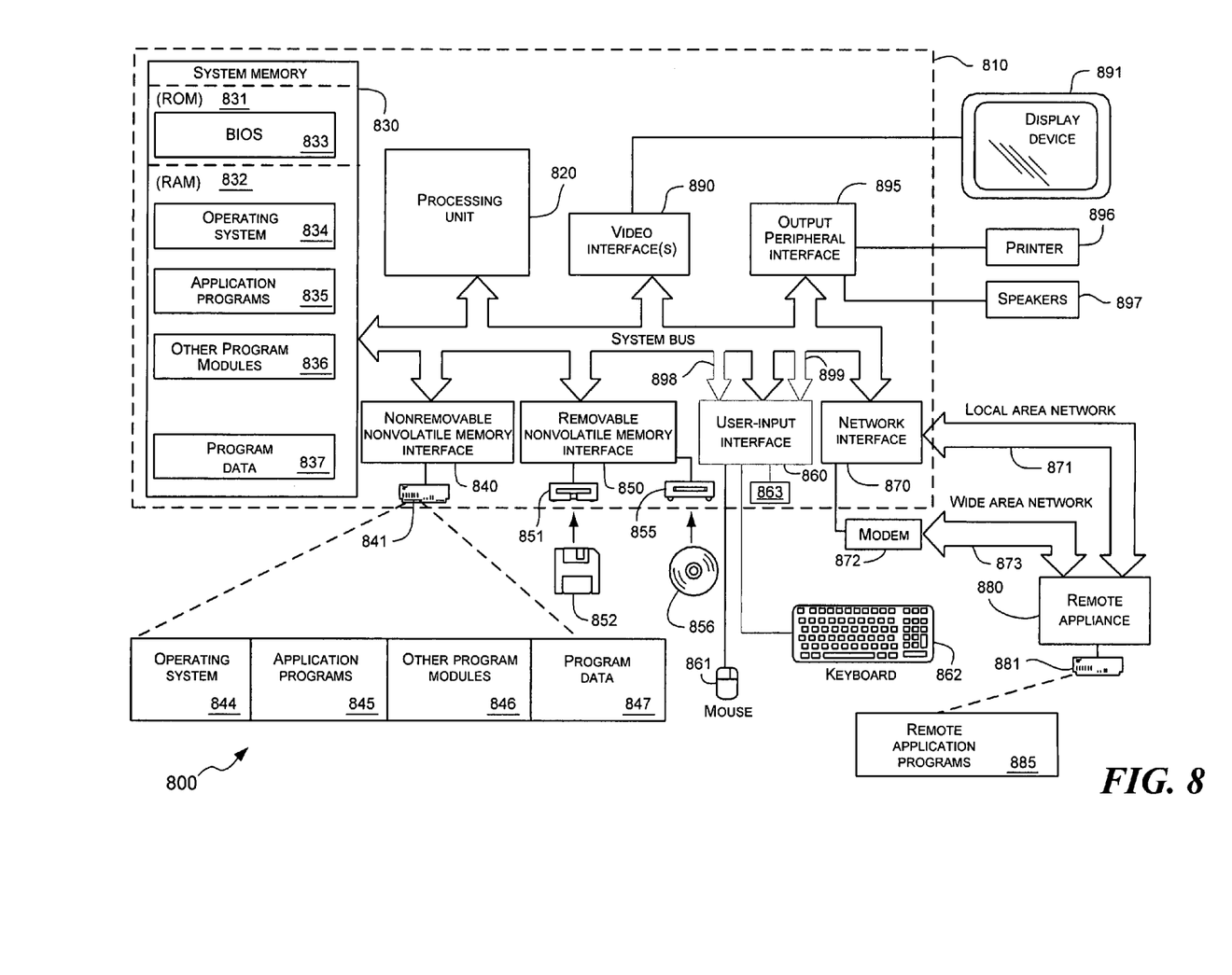
FIG. 8 is a functional diagram of a computing-system environment suitable for use in encrypting and decoding codestreams.

FIG. 8 illustrates an exemplary computing system 800 for implementing embodiments of the scalable key management system. The computing system 800 is only one example of a suitable operating environment and is not intended to suggest any limitation as to the scope of use or functionality of exemplary embodiments of the key management process previously described or other embodiments. Neither should the computing system 800 be interpreted as having any dependency or requirement relating to any one or combination of components illustrated in the exemplary computing system 800.

The key management process and associated encryption and decryption processes may be described in the general context of computer-executable instructions, such as program modules, being executed on computing system 800. Generally, program modules include routines, programs, objects, components, data structures, etc., that perform particular tasks or implement particular abstract data types. Moreover, those skilled in the art will appreciate that the key management process may be practiced with a variety of computer-system configurations, including hand-held devices, multi-processor systems, microprocessor-based or programmable-consumer electronics, minicomputers, mainframe computers, and the like. The key management process may also be practiced in distributed-computing environments where tasks are performed by remote-processing devices that are linked through a communications network. In a distributed-computing environment, program modules may be located in both local and remote computer-storage media including memory-storage devices.

With reference to FIG. 8, an exemplary computing system 800 for implementing the key management process includes a computer 810 including a processing unit 820, a system memory 830, and a system bus 821 that couples various system components including the system memory 830 to the processing unit 820.

Computer 810 typically includes a variety of computer-readable media. By way of example, and not limitation, computer-readable media may comprise computer-storage media and communication media. Examples of computer-storage media include, but are not limited to, Random Access Memory (RAM); Read Only Memory (ROM); Electronically Erasable Programmable Read Only Memory (EEPROM); flash memory or other memory technology; CD ROM, digital versatile discs (DVD) or other optical or holographic disc storage; magnetic cassettes, magnetic tape, magnetic disk storage or other magnetic storage devices; or any other medium that can be used to store desired information and be accessed by computer 810. The system memory 830 includes computer-storage media in the form of volatile and/or nonvolatile memory such as ROM 831 and RAM 832. A Basic Input/Output System 833 (BIOS), containing the basic routines that help to transfer information between elements within computer 810 (such as during start-up) is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer-storage media. By way of example only, FIG. 8 illustrates a hard disk drive 841 that reads from or writes to nonremovable, nonvolatile magnetic media, a magnetic disk drive 851 that reads from or writes to a removable, nonvolatile magnetic disk 852, and an optical-disc drive 855 that reads from or writes to a removable, nonvolatile optical disc 856 such as a CD-ROM or other optical media. Other removable/nonremovable, volatile/nonvolatile computer-storage media that can be used in the exemplary operating environment include, but are not limited to, magnetic tape cassettes, flash memory units, digital versatile discs, digital video tape, solid state RAM, solid state ROM, and the like. The hard disk drive 841 is typically connected to the system bus 821 through a nonremovable memory interface such as interface 840. Magnetic disk drive 851 and optical disk drive 855 are typically connected to the system bus 821 by a removable memory interface, such as interface 850.

The drives and their associated computer-storage media discussed above and illustrated in FIG. 8 provide storage of computer-readable instructions, data structures, program modules and other data for computer 810. For example, hard disk drive 841 is illustrated as storing operating system 844, application programs 845, other program modules 846, and program data 847. Note that these components can either be the same as or different from operating system 834, application programs 835, other program modules 836, and program data 837. Typically, the operating system, application programs, and the like that are stored in RAM are portions of the corresponding systems, programs, or data read from hard disk drive 841, the portions varying in size and scope depending on the functions desired. Operating system 844, application programs 845, other program modules 846, and program data 847 are given different numbers here to illustrate that, at a minimum, they can be different copies. A user may enter commands and information into the computer 810 through input devices such as a keyboard 862; pointing device 861, commonly referred to as a mouse, trackball or touch pad; a wireless-input-reception component 863; or a wireless source such as a remote control. Other input devices (not shown) may include a microphone, joystick, game pad, satellite dish, scanner, or the like. These and other input devices are often connected to the processing unit 820 through a user-input interface 860 that is coupled to the system bus 821 but may be connected by other interface and bus structures, such as a parallel port, game port, IEEE 1394 port, or a universal serial bus (USB) 898, or infrared (IR) bus 899. As previously mentioned, input/output functions can be facilitated in a distributed manner via a communications network.

A display device 891 is also connected to the system bus 821 via an interface, such as a video interface 890. Display device 891 can be any device to display the output of computer 810 not limited to a monitor, an LCD screen, a TFT screen, a flat-panel display, a conventional television, or screen projector. In addition to the display device 891, computers may also include other peripheral output devices such as speakers 897 and printer 896, which may be connected through an output peripheral interface 895.

The computer 810 will operate in a networked environment using logical connections to one or more remote computers, such as a remote computer 880. The remote computer 880 may be a personal computer, and typically includes many or all of the elements described above relative to the computer 810, although only a memory storage device 881 has been illustrated in FIG. 8. The logical connections depicted in FIG. 8 include a local-area network (LAN) 871 and a wide-area network (WAN) 873 but may also include other networks, such as connections to a metropolitan-area network (MAN), intranet, or the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the network interface 870, or other appropriate mechanism. Modem 872 could be a cable modem, DSL modem, or other broadband device. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary, and other means of establishing a communications link between the computers may be used.

Although many other internal components of the computer 810 are not shown, those of ordinary skill in the art will appreciate that such components and the interconnections are well-known. For example, including various expansion cards such as television-tuner cards and network-interface cards within a computer 810 is conventional. Accordingly, additional details concerning the internal construction of the computer 810 need not be disclosed in describing exemplary embodiments of the key management process.

When the computer 810 is turned on or reset, the BIOS 833, which is stored in ROM 831, instructs the processing unit 820 to load the operating system, or necessary portion thereof, from the hard disk drive 841 into the RAM 832. Once the copied portion of the operating system, designated as operating system 844, is loaded into RAM 832, the processing unit 820 executes the operating system code and causes the visual elements associated with the user interface of the operating system 834 to be displayed on the display device 891. Typically, when an application program 845 is opened by a user, the program code and relevant data are read from the hard disk drive 841 and the necessary portions are copied into RAM 832, the copied portion represented herein by reference numeral 835.

Server and Client Systems for Encoding and Decoding Scalable Codestream

Figure 9:
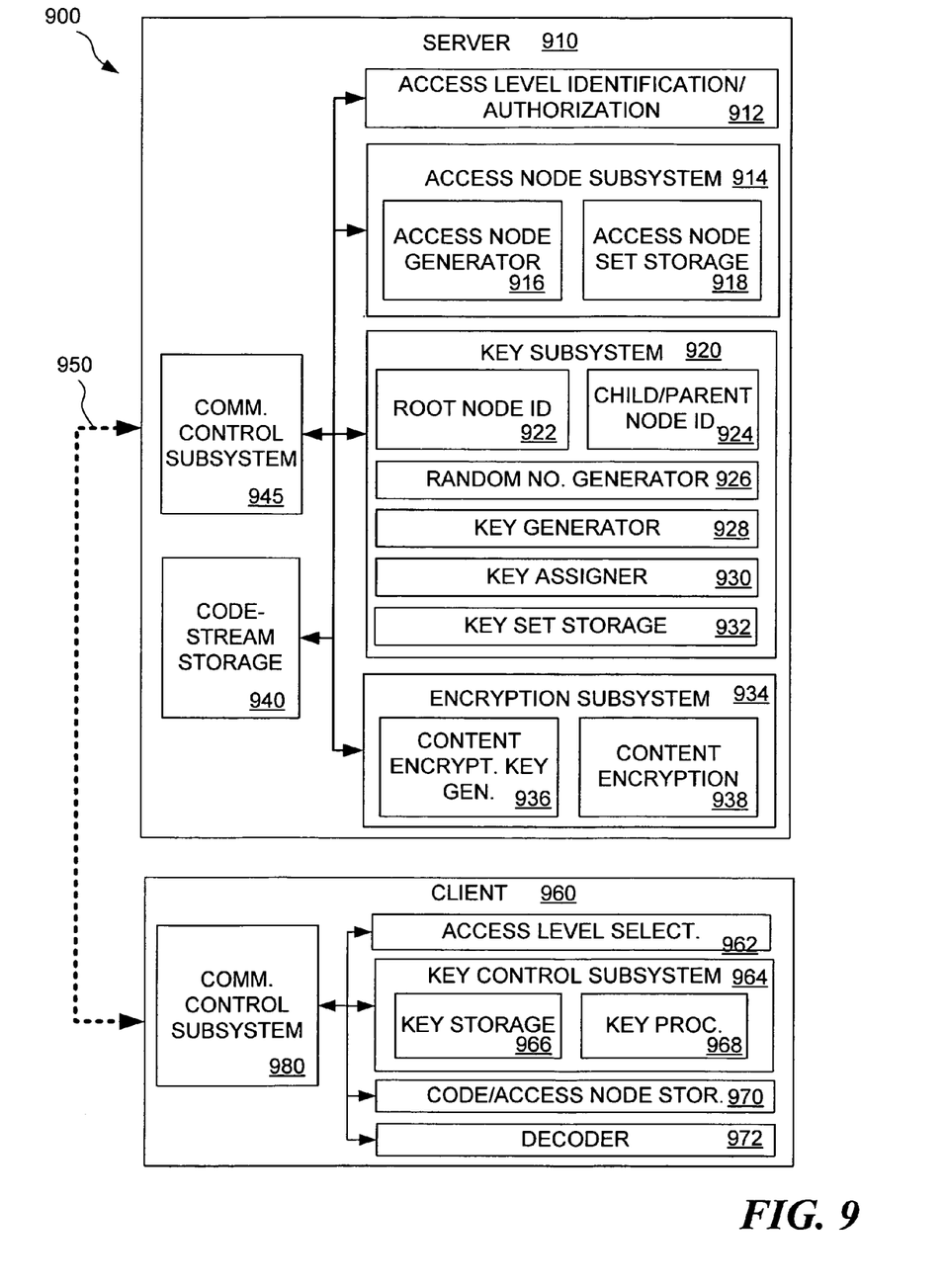
FIG. 9 is a functional block diagram of a system including a server and a client used in distribution of access nodes and keys for controlling access to an encoded scalable codestream.

FIG. 9 illustrates a functional block diagram of a system 900 including a server 910 operable to provide secured scalable codestreams over a network 950 to a client 960 able to decode the codestream according to modes of the present invention. System 900 may be implemented using one or more servers 910, including one or more servers to provide content and one or more additional servers to perform encryption, key management, client authorization, and other functions. Also, there may be a great number of clients 960 accessing the server or servers 910 over network 950. Notwithstanding, for simplicity of illustration, FIG. 9 shows a single server 910 operable to provide content and perform key management functions that is accessible over network 950 by a single client 960.

Server 910 includes an access level identification and authorization subsystem 912 that receives authorization requests for various level combinations and authorizes clients to be able to decode codestreams from server 910, as is further described below. Server also includes access node subsystem 914. Access node subsystem includes access node generator 916 which derives access nodes corresponding to combinations of levels of access available within a scalable codestream as described in connection with FIG. 5. Access nodes generated are stored in access node set storage 918 for development of a key set and for provision with the codestream for decryption purposes.

Key subsystem 920 includes a root node identifier 922 and a child and parent node identifier 922 used to develop keys as described in connection with FIG. 6. Also as described in connection with FIG. 6, a random number generator 926 generates random numbers for use as the root node key and for association with each of the child nodes to develop the child node keys. Key generator 928 generates the keys as described in connection with FIG. 6, and key assignor 930 associates the appropriate keys with each of the access nodes. The generated keys are stored in key set storage 932, such that keys for all the access nodes are generated only once, and keys can be drawn from the key set storage 932 in response to authorization requests.

Once the keys are generated and stored in key subsystem 920, encryption subsystem 934 encrypts the codestream. As described in connection with FIG. 6, content encryption key generator 936 derives content encryption keys for the data packets based on the keys associated with the access nodes with which the packets are associated. Using the content keys, codestream encryption subsystem 938 encrypts the scalable codestream which is stored in codestream storage 940. Client authorization requests, authorization approvals, keys, and codestreams are exchanged via a communication control subsystem 945 that is in communication with network 950.

Client 960 initiates requests to access secure scalable codestreams with access level selection subsystem 962, which identifies the level combination indicating the desired level of access for each access type within the scalable codestream. If an authorization request is successful, a key is received from server 910 by key control subsystem 964. The key is stored in key storage 966 and, using the key received and the access node set, key processing subsystem 968 derives keys associated with lower ranked levels within the codestream, as well as content encryption keys decoding the codestream. Codestreams are stored in codestream/access node storage 970, and decrypted by decoder 972. A client communications control subsystem 980 is operable to send authorization requests and receive keys and codestreams.

CONCLUSION

Although exemplary embodiments have been described in language specific to structural features and/or methodological acts, it is to be understood that the appended claims are not necessarily limited to the specific features or acts previously described. Rather, the specific features and acts are disclosed as exemplary embodiments.

The invention claimed is:

1. A computer-storage medium having computer-useable instructions embodied thereon for executing a method of accessing levels within a codestream comprising a plurality of scalable access types, comprising:

identifying a first desired level of access among a set of first levels of a fully-ordered access type, in which each lower-ranked first level is always included within each higher-ranked first level;

identifying a second desired level of access among a second set of second levels of a partially-ordered access type, in which each lower-ranked second level is not always included within each higher-ranked second level;

securing authorization to access the codestream at a desired level combination comprising the first desired level and the second desired level;

receiving an access node set comprising a partially-ordered set of access nodes representing a product of a fully-ordered node set representing the fully-ordered access type and a partially ordered node set representing the partially-ordered access type;

receiving a single key allowing access to the codestream at the desired level combination; and using the access node set and the single key to access at least one lower combination comprising at least one of a lower-ranked first level and a lower-ranked second level.

2. A system for controlling access to levels within a codestream comprising a plurality of scalable access types, the system comprising:

a server comprising one or more computers programmed to perform actions including:

maintaining an access node set comprising a plurality of access nodes each representing a member of a partially ordered set of combinations of levels to a plurality of scalable access types, wherein the access node set is a product of at least one fully-ordered set and at least one partially-ordered set;

maintaining a key for each of the plurality of access nodes, each key permitting access to a combination of levels associated with an access node and any combination of levels comprising at least one lower-ranked level;

receiving an authorization request for a desired level combination indicating a desired access level for each of the plurality of scalable access types;

identifying set a desired access node for the desired level combination and retrieving a desired key for with the desired access node; and communicating the access node set and the desired key; and a client comprising one or more computers programmed to perform actions including:

selecting the desired level combination;

receiving the access node set and the desired key; and using the desired key access to the codestream at the desired level combination and, by using the access node set and the desired key, deriving at least one additional key providing access to a combination of levels comprising at least one lower-ranked level.

3. The system of claim 2, wherein the server is further programmed to generate the key for each of the plurality of access nodes by performing actions comprising:

identifying a root node from the access node set, the root node representing a combination of highest levels for the plurality of scalable access types;

assigning a root key to the root node;

identifying access nodes other than the root node as child nodes;

identifying at least one parent node for each of a plurality of child nodes, the parent node representing a combination of levels for which one of the combination of levels is a next higher-ranked level than for the child node; and for each of the child nodes, calculating a child key from at least one parent key of the at least one parent node of the child node.

4. The system of claim 3, wherein the server is further programmed to generate the key for each of the plurality of access nodes, by performing actions comprising:

associating a random number with each of the child nodes; and for each of the child nodes, calculating the child key using a group Diffie Hellman protocol using the random number associated with the child node and the at least one parent key of the at least one parent node of the child node.

* * * * *